United States Patent [19]

Langley et al.

[11] Patent Number: 4,981,888
[45] Date of Patent: Jan. 1, 1991

[54] RESIN COMPOSITIONS

[75] Inventors: Robert Langley, Newton Mearns, Scotland; Colin D. Campbell, Wilmington, Del.

[73] Assignee: Ciba-Geigy Corporation, Ardsley, N.Y.

[21] Appl. No.: 352,086

[22] Filed: May 15, 1989

[30] Foreign Application Priority Data

May 17, 1988 [GB] United Kingdom ............... 8811649

[51] Int. Cl.$^5$ ............................................. C08K 5/34
[52] U.S. Cl. ................................. 524/88; 524/587; 524/605; 524/606; 524/611
[58] Field of Search .......................................... 524/88

[56] References Cited

U.S. PATENT DOCUMENTS 2,761,868  9/1956  Lacey ............................ 260/314.5
4,066,610  1/1978  Kiss et al. ............................ 524/88
4,208,318  6/1980  Ona et al. ............................ 524/88

FOREIGN PATENT DOCUMENTS 53-51241  11/1978  Japan .
57-92036  5/1982  Japan .

OTHER PUBLICATIONS

Derwent Abst. 82-58535e/28.
Derwent Abst. 78-44617A/25.

*Primary Examiner*—Lewis T. Jacobs
*Assistant Examiner*—Karen A. Hellender
*Attorney, Agent, or Firm*—Luther A. R. Hall

[57] ABSTRACT

A pigmented thermoplastic resin composition comprising:
(A) a thermoplastic resin;
(B) a metal phthalocyanine pigment; and
(C) 0.5 to 30% by weight, based on the weight of the pigment (B), as agent imparting heat stability to component (B), of a sulphonated imidomethyl phthalocyanine having the formula I:

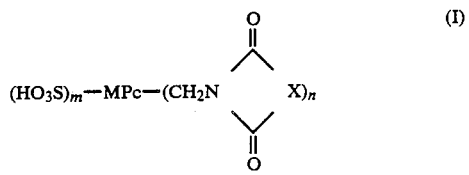

wherein Pc is a phthalocyanine residue optionally substituted by up to 4 chlorine or bromine atoms;
M is hydrogen or a metal capable of forming a metal phthalocyanine;
m is a vlaue within the range of from 0.05 to 1.0;
n is a value within the range of from 0.1 to 4.0; and
X is a residue such that, in combination with the group

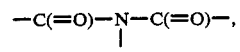

it form a 5-, 6- or 7-membered cyclic imide.

13 Claims, No Drawings

RESIN COMPOSITIONS

The present invention relates to pigmented thermoplastic resins, in which the pigment is stabilized to heat by the addition of a sulphonated imidomethylated phthalocyanine.

In Japanese Patent Kokai No. Sho 57-92036 there is disclosed a method of preventing heat deterioration of a polyolefin containing a copper phthalocyanine, by adding a derivative of a copper phthalocyanine. The copper phthalocyanine derivative is obtained from chloromethyl copper phthalocyanine, which may be optionally halogenated, and methylphthalimide.

There is no indication that the copper phthalocyanine derivative used has any sulpho group content and the derivative is present as a stabilizer for the polyolefin substrate rather than the copper phthalocyanine colourant. The test evaluations are concerned solely with the degree of deterioration of the substrate, any degradation of the colourant is not considered.

Moreover, in Japanese Patent Kokai No. Sho 53-51241 a process for colouring specifically an ABS resin is described using a mixture of a copper phthalocyanine pigment and a phthalimidomethyl copper phthalocyanine pigment. While the phthalimidomethyl copper phthalocyanine pigment is added as a stabilizer for the copper phthalocyanine pigment, the stabilizer is not believed to contain any sulpho groups.

We have now found certain sulphonated imidomethyl phthalocyanines which, when incorporated, in minor stabilizing amounts, together with a phthalocyanine pigment, into a thermoplastic resin, impart outstanding heat stability to the phthalocyanine pigment of the pigmented resin system.

Accordingly, the present invention provides a heat-stable, pigmented thermoplastic resin composition comprising:

(A) a thermoplastic resin;
(B) a metal phthalocyanine pigment; and
(C) 0.5 to 30% by weight, based on the weight of the pigment (B), as agent imparting heat stability to component (B), of a sulphonated imidomethyl phthalocyanine having the formula I:

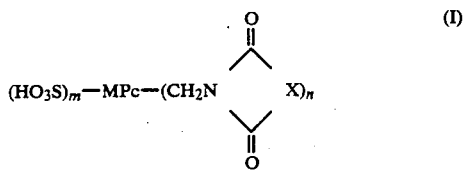
(I)

wherein Pc is a phthalocyanine residue optionally substituted by up to 4, preferably up to 1 chlorine or bromine atom, more preferably Pc is not substituted by chlorine or bromine;

M is hydrogen or a metal capable of forming a metal phthalocyanine, preferably magnesium, aluminium, cobalt, nickel, iron, zinc, lead, tin or, especially, copper;

m is a value within the range of from 0.05 to 1.0, preferably 0.05 to 0.2;

n is a value within the range of from 0.1 to 4.0, preferably 1.0 to 3.0;

and X is a residue such that, in combination with the group

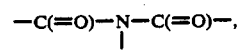

it forms a 5-, 6- or 7-membered cyclic imide.

The thermoplastic resin, component (A), may be rubber or any of the so-called "engineering plastics" such as high density polyethylene (HDPE), polybutylene terephthalate (PBTP), polycarbonate (PC), polyamide (PA), polyphenylene oxide (PPO), polyether ether ketone (PEEK), polyphenylene sulphide (PPS), polyether sulphone (PES), acrylonitrilebutadiene-styrene (ABS) copolymer, polypropylene (PP), polystyrene (PS), polyacetal (POM) and alloys thereof e.g. a PC/PBTP alloy.

The metal phthalocyanine base pigment, component (B), may be unchlorinated or, if chlorinated, it may contain up to 6%, preferably from 1 to 3% by weight of chlorine. Preferably the phthalocyanine is unchlorinated, in particular unchlorinated copper phthalocyanine.

The amount of pigment component (B) present in the composition of the invention may be up to 30% by weight and preferably ranges from 0.001 to 3% by weight, based on the weight of component (A).

When, in formula I, X together with the

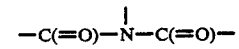

group, represents a 5-membered cyclic imide, such imides include e.g. succinimide, maleimide, itaconimide, phthalimide, tetrahydrophthalimide, cis-5-norbornene-endo-2,3-dicarboximide, 3,6-endoxo-1,2,3,6-tetrahydrophthalimide, 1,2- or 2,3-naphthalene dicarboximide or quinolinimide (pyridine-2,3-dicarboximide) each optionally substituted with one or more halogen atoms, preferably chlorine or bromine atoms, $C_1$-$C_{20}$ alkyl groups, $C_3$-$C_{20}$ alkenyl groups, nitro groups or carboxy groups.

When, in formula I, X together with the

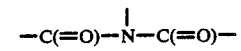

group represents a 6-membered cyclic imide, such imides include e.g. glutarimide, 3,3-tetramethylene glutarimide, 1,8-naphthalene dicarboximide or perylene-1,12-dicarboximide, each optionally substituted with one or more halogen atoms, especially chlorine or bromine atoms, $C_1$-$C_{20}$ alkyl groups, $C_3$-$C_{20}$ alkenyl groups, nitro groups or carboxy groups.

When, in formula I, X together with the

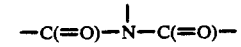

group is a 7-membered cyclic imide, such imides may be, e.g., adipimide or diphenic imide each optionally substituted with one or more halogen atoms, preferably chlorine or bromine atoms, $C_1$-$C_{20}$ alkyl groups, $C_3$-$C_{20}$ alkenyl groups, nitro groups or carboxy groups.

5-membered cyclic imides are preferred, in particular dimethylmaleimide and especially phthalimides viz. X is o-phenylene, and substituted derivatives thereof.

The compounds of formula I containing sulphonic acid are known materials and may be produced by the method described in U.S. Pat. No. 2,761,868. Thus, in one preferred method described in U.S. Pat. No. 2,761,868, imidomethylation of copper phthalocyanine is effected, followed by sulphonation.

The present invention also provides a method of imparting heat stability to a pigment in a pigmented thermoplastic resin, comprising incorporating into a thermoplastic resin, a metal phthalocyanine pigment and, as heat stabiliser for the metal phthalocyanine pigment, 0.5 to 30% by weight of a sulphonated imidomethyl phthalocyanine of formula I, based on the weight of the metal phthalocyanine pigment.

The compound of the formula I is conveniently incorporated into the crude base phthalocyanine pigment, component (B), during processing of the latter, prior to incorporating the mixture of components (B) and (C) so obtained, into the thermoplastics resin, component (A). Preferably 0.5 to 30%, more preferably 3-15% by weight of compound of formula I, based on the weight of the metal phthalocyanine pigment, is incorporated into component (B).

The processing, or conversion of the crude base phthalocyanine pigment into pigmentary form, may be effected by mixing the crude phthalocyanine with the sulphonated imidomethyl phthalocyanine of formula I, and milling the mixture. The milling is performed in the presence of a solid particulate grinding aid which can be removed after the milling process. The grinding aid may be, e.g., an alkali metal or alkaline earth metal salt of a mineral acid, such as sodium chloride or calcium chloride. Amounts of grinding aid of up to 500% by weight, based on the phthalocyanine composition, may be used. If desired, 2.5 to 25% by weight, based on the weight of the grinding aid, of an alkali metal salt of an organic acid, e.g. sodium acetate, may also be present during the milling process.

If the crude phthalocyanine starting material used is copper phthalocyanine, such processing will result in a stable pigmentary copper phthalocyanine which is predominantly in the alpha crystal modification. If it is desired to convert the crude copper phthalocyanine into pigmentary beta-form copper phthalocyanine, then the grinding may be carried out in the presence of 0.5 to 10% by weight, based on the weight of the copper phthalocyanine composition, of an organic liquid such as diethylaniline.

In a second method of producing a pigmentary phthalocyanine having desirable particle size and enhanced colouristic properties, the base phthalocyanine material may be milled and treated with a polar organic e.g. isopropanol, which is at least partially water-miscible. The sulphonated imidomethyl phthalocyanine of formula I may be incorporated at any stage during processing.

In a third method of converting crude phthalocyanine starting material into pigmentary form, the crude phthalocyanine may be mixed with the sulphonated imidomethyl phthalocyanine of formula I; strong sulphuric acid may be added to the mixture; and then the phthalocyanine is re-precipitated by adding the sulphuric acid solution or slurry to water.

The amount of strong sulphuric acid used may be from 200 to 1500% by weight, based on the weight of the phthalocyanine composition, and the acid treatment may be effected at a temperature ranging from 0° to 100° C., preferably from 40° to 80° C.

If desired, a surfactant may be added to the water before the acid solution is added to the water. The amount of optional surfactant is conveniently from 0.5 to 10% by weight, based on the weight of the phthalocyanine composition, and a suitable surfactant is dodecylbenzene sulphonic acid.

If the crude phthalocyanine starting material used is copper phthalocyanine, such acid processing will result in a stable pigmentary copper phthalocyanine which is in the alpha crystal modification. If desired, this product may be subjected to the milling processing described hereinbefore to bring the pigmentary alpha-form copper phthalocyanine within a desired range of particle size.

In a fourth method of converting crude phthalocyanine into pigmentary form, the crude phthalocyanine alone may be treated with strong sulphuric acid; then re-precipitated by adding the acid solution to water; subjecting the pigmentary product so obtained to a milling process, e.g. as described hereinbefore, and incorporating the sulphonated imidomethyl phthalocyanine of formula I during the milling process, or at a later stage during processing.

The pigmentary composition, comprising the metal phthalocyanine component (B) and the sulphonated imidomethyl phthalocyanine of formula I, may be incorporated into the thermoplastic resin by any conventional method.

The following Examples further illustrate the present invention. Percentages are by weight.

EXAMPLE 1

A. Synthesis of sulphonated phthalimidomethyl copper phthalocyanine

Copper phthalocyanine (24.7 g) is added to 98% sulphuric acid (152 g) keeping temperature below 60° C. Phthalimide (22.9 g) and 97% paraformaldehyde (5 g) are then added and the mixture stirred until temperature remains constant. 20% Oleum (132.6 g) is added, with good stirring, so that temperature is held below 80° C., then the mixture is stirred at 80° C. for 6 hours.

The reaction mixture is poured into water (930 g), with efficient stirring, and the product is isolated by filtration and washing acid-free with hot water. A sample, purified by solvent extraction and drying shows a phthalimidomethyl content of 2.3 groups per molecule and a sulphonic acid level of 0.07 groups per molecule. Yield is 40 g.

B. Incorporation of Additive Into Pigment

Copper phthalocyanine (29.3 g), anhydrous calcium chloride (55.0 g) and sodium acetate crystals (5 g) are ball-milled in a vibration mill with 12 mm steel balls for 12 hours then slurried into isopropanol:water (93:17, 280 g) containing gum rosin solution (10 g of an alkaline solution of 16.6% rosin). The mixture is heated under reflux, with agitation for 1 hour, then hot water (160 g) is added. The isopropanol is removed as an azeotrope and cold water (68 g) added to the residue.

The product from part A (1.6 g at 100%) is slurried in water and added to the copper phthalocyanine slurry. After 30 minutes stirring, 35% hydrochloric acid (16.6 g) is added and the mixture stirred 1 hour at 50°-60° C. The pigment is filtered, washed with cold water until the filtrate is chloride free, then dried at 60° C. Yield is 31.6 g.

C. Incorporation of Pigment Into HDPE and Heat Stability Test

The pigment, as prepared in (B) is milled and sieved through a 150 micron screen. Into a two-roll mill, with the rollers set at 150° C. and 110° C. and the nip gap at 0.3 mm, is introduced high density polyethylene (100 g). The polymer is milled for one minute to ensure uniformity, then the pigment from B (0.1 g) is sprinkled, over 30 seconds, on to the polymer. After milling, cutting, folding and reworking for 8 minutes, the nip is adjusted to 1.5 mm, and the hide sheeted off, allowed to cool to room temperature and chipped.

The chipped material is fed to an injection moulding machine with the barrel set at 200° C. Once the feed is running uniformly through the machine, a high density polyethylene moulding is obtained which has a strong blue shade. The procedure is repeated several times with the barrel temperature being increased to 320° C. in 20° C. steps, with a 5 minute dwell time at each temperature.

The strong blue shade is maintained to a significantly higher temperature than if the pigment used is prepared as in (B) but without the incorporation of sulphonated phthalimidomethyl copper phthalocyanine.

EXAMPLE 2

A. Synthesis of Sulphonated Phthalimidomethyl Zinc Phthalocyanine

Zinc phthalocyanine (53.6 g) is added to 98% sulphuric acid (325 g) and stirred for 30 minutes. Phthalimide (49.5 g) and 97% paraformaldehyde (10.8 g) are added and the mixture stirred for a further 30 minutes, allowing adiabatic temperature rise. 20% oleum (286 g) is then added over 30 minutes and the mixture stirred at 80° C. for 6 hours.

The reaction mixture is then poured into ice cold water (1000 g), with efficient stirring. The greenish product is isolated by filtration and washing acid-free with hot water. A sample, dried and solvent extracted showed a phthalimidomethyl content of 3 groups per molecule and a sulphonic acid level of 0.3 groups per molecule. Yield is 92 g.

B. Incorporation of Additive Into Pigment

Using the procedure described in Example 1B, the product from Example 2A is incorporated to give a 5% level of additive in the copper phthalocyanine pigment.

C. Incorporation of Pigment Into HDPE and Heat Stability Test

Using the procedure described in Example 1C, the pigment from Example 2B is incorporated into HDPE at 0.1% pigmentation to give a moulded blue plastic which possesses significantly higher heat stability than a comparison product containing a pigment obtained without utilising the sulphonated phthalimidomethyl zinc phthalocyanine prepared in Example 2A.

EXAMPLE 3

In this Example, a sulphonated phthalimidomethyl copper phthalocyanine having a phthalimidomethyl content of 3 groups per molecule and a sulphonic acid level of 0.3 groups per molecule is obtained by an analogous method to that described in Example 1A, except that the 20% oleum used is increased to 165.8 g.

After incorporation into copper phthalocyanine at 5% as in Example 1B and pigmentation of HDPE at 0.1% as in Example 1C, the product showed significantly higher heat stability than a comparison product obtained without incorporating the sulphonated phthalimidomethyl copper phthalocyanine.

EXAMPLE 4

A. Synthesis of Sulphonated Tetrachlorophthalimidomethyl Copper Phthalocyanine Copper phthalocyanine (14.4 g) is added to 98% sulphuric acid (88.3 g) and after 30 minutes, tetrachlorophthalimide (25 g) 97% and paraformaldehyde (2.7 g) are added. After 30 minutes, 20% oleum (76 g) is added and the mixture stirred at 80° C. for 6 hours.

The mixture is poured into water (1000 g), with good stirring, and the product isolated by filtration and washing acid-free with warm water. Analysis of a sample, purified by solvent extraction, shows a tetrachlorophthalimidomethyl content of 2.5 groups per molecule and a sulphonic acid level of 0.2 groups per molecule. Yield is 40 g (at 81% purity).

B. Incorporation of Additive Into Pigment

Using the procedure described in Example 1B, the product from Example 4A is incorporated to give a 5% level of additive in the copper phthalocyanine pigment.

C. Incorporation of Additive Into HDPE and Heat Stability Test

Using the procedure described in Example 1C, the pigment from Example 4B is incorporated into HDPE at 0.1% pigmentation to give a moulded blue plastic which possesses considerably higher stability than a comparison product nor containing the additive of Example 4A.

EXAMPLE 5

A. Incorporation of Additive Into Pigment

Copper phthalocyanine (1.6% chlorine content; 16 g), sodium acetate crystals (22.3 g) and sodium chloride (44.5 g) are ball-milled in a vibration mill with 12 mm steel balls for 4 hours 30 minutes then slurried into water (320 g). The product from Example 1A (1.29 g at 100%) is slurried in water and added to the copper phthalocyanine slurry. After 30 minutes stirring, 35% hydrochloric acid (6.7 g) is added and the mixture stirred for 1 hour at 50°-60° C. The pigment is filtered, washed with cold water until the filtrate is chloride free, then dried at 60° C. Yield is 16.5 g.

B. Incorporation of Pigment Into HDPE and Heat Stability Test

Using the procedure described in Example 1C, the pigment from Example 5A is incorporated into HDPE at 0.1% pigmentation to give a moulded blue plastic which possesses considerably higher stability than a comparison product not containing the additive of Example 1A.

EXAMPLE 6

The pigment prepared in Example 1B, milled and sieved through a 150 micron screen, is incorporated into ABS (acrylonitrile-butadiene-styrene copolymer) at 0.1% on a two-roll mill at 190° C., followed by injection moulding at temperature stages of 20° C. from 200° C., with a 5 minute dwell time at each temperature.

The strong blue shade is maintained to a significantly higher temperature than a comparison product in which the additive of Example 1A is omitted.

EXAMPLE 7

The pigment prepared in Example 1B is milled and sieved through a 150 micron screen. Into a two-roll mill, with the rollers set at 150° C. and 110° C. and nip gap at 0.3 mm, is introduced HDPE (100 g). The polymer is milled for 1 minute to ensure uniformity, then finely powdered titanium dioxide (1 g) is sprinkled over the polymer during 30 seconds. The polymer is then cut and folded continuously for a further 30 seconds. The blue pigment is (0.1 g) sprinkled into the polymer during a further 30 seconds. After milling, cutting, folding and reworking for 8 minutes, the nip is adjusted to 1.5 mm, the hide sheeted off, allowed to cool to room temperature, chipped, and fed to an injection moulding machine with the barrel set initially at 200° C., then increasing the barrel temperature to 320° C. in steps of 20° C., with a 5 minute dwell time at each temperature.

The opaque blue moulds obtained show uniformity of shade to a significantly higher temperature than a comparison product in which the additive of Example 1 (A) has been omitted.

EXAMPLES 8–12

The following additives are incorporated into pigment according to the method of Example 1B to give a 5% level of additive.

8. Sulphonated maleimidomethyl copper phthalocyanine bearing 1.27 maleimidomethyl groups and 0.08 sulphonic acid groups per copper phthalocyanine molecule.
9. Sulphonated methylmaleimidomethyl copper phthalocyanine bearing 2.3 methylmaleimidomethyl groups and 0.07 sulphonic acid groups per copper phthalocyanine molecule.
10. Sulphonated dimethylmaleimidomethyl copper phthalocyanine bearing 2.3 dimethylmaleimidomethyl groups and 0.07 sulphonic acid groups per copper phthalocyanine molecule.
11. Sulphonated 1,8-naphthalimidomethyl copper phthalocyanine bearing 2.3 naphthalimidomethyl groups and 0.07 sulphonic acid groups per copper phthalocyanine molecule.
12. Sulphonated diphenicimidomethyl copper phthalocyanine bearing 2.3 diphenicimidomethyl groups and 0.07 sulphonic acid groups per copper phthalocyanine molecule.

EXAMPLE 13

The pigment composition, as prepared in Example 1B is milled and sieved through a 150 micron screen.

A homogeneous blend of polybutylene terephthalate resin (100 g), finely powdered titanium dioxide (1.0 g) and pigment (0.2 g) is extruded at 260° C. and granulated. The granulated compound is then fed into an injecting moulding machine, with the barrel set at 260° C. Once the compound is running uniformly through the machine, blue shade mouldings are produced. The injection moulding procedure is then repeated with the barrel set at 260° C., 275° C. and again at 290° C., with a five minute dwell at each temperature. The blue shade is maintained to a very significantly greater level of uniformity across the above temperature range than that of a comparison product in which the sulphonated phthalimidomethyl copper phthalocyanine has been omitted.

EXAMPLE 14

The pigment composition, as prepared in Example 1B is milled and sieved through a 150 micron screen.

A homogeneous blend is then produced, comprising polycarbonate/polybutylene terephthalate alloy (100 g) and pigment (0.1 g). This homogeneous blend is extruded at 260° C. and granulated. The granulated compound is then fed into an injection moulding machine with the barrel set at 260° C. Injection mouldings are produced once the operating conditions of the machine are under control and the compound is running uniformly. The injection moulding procedure is then repeated with the barrel set at 260° C., 270° C., 280° C., 290° C. and 300° C., with a five minute dwell at each temperature. The blue shade is maintained to a very significantly greater level of uniformity across the above temperature range than that of a comparison product in which the sulphonated phthalimidomethyl copper phthalocyanine has been omitted.

EXAMPLE 15

The pigment composition as prepared in Example 1B is incorporated into polypropylene at 0.1% pigmentation, using the procedure described in Example 1C. The strong blue shade is maintained to a significally higher temperawture than if the pigment used is prepared as in Example 1B, but without the incorporation of sulphonated phthalimidomethyl copper phthalocyanine.

EXAMPLE 16

The pigment composition as prepared in Example 1B is incorporated into polystyrene at 0.1% pigmentation, using the procedure described in Example 1C. The strong blue shade is maintained to a significantly higher temperature than if the pigment used is prepared as in Example 1B, but without the incorporation of sulphonated phthalimidomethyl copper phthalocyanine.

We claim:

1. A pigmented thermoplastic resin composition which comprises
   (A) a thermoplastic resin;
   (B) a metal phthalocyanine pigment susceptible to degradation by heat; and
   (C) 0.5 to 30% by weight, based on the weight of pigment (B), as an agent imparting heat stability to component (B), of a sulphonated imidomethyl phthalocyanine having formula I

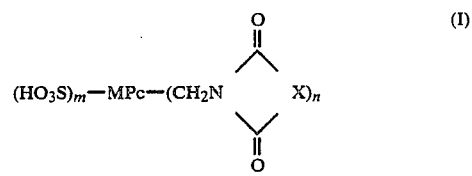

wherein Pc is a phthalocyanine residue optionally substituted by up to 4 chlorine or bromine atoms;

M is hydrogen or a metal capable of forming a metal phthalocyanine;

m is a value within the range of from 0.05 to 1.0;

n is a value within the range of from 0.1 to 4.0; and

X together with the group

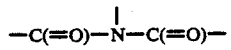

represents a 5-membered cyclic imide which is a succinimide, maleimide, itaconimide, phthalimide, tetrahydrophthalimide, cis-5-norbornene-endo-2,3-dicarboximide, 3,6-endoxo-1,2,3,6-tetrahydrophthalimide, 1,2- or 2,3-naphthalene dicarboximide or pyridine-2,3-dicarboximide, each optionally substituted with one or more halogen atoms, $C_1$–$C_{20}$-alkyl groups, $C_3$–$C_{20}$-alkenyl groups, nitro groups or carboxy groups; or represents a 6-membered cyclic imide which is a glutarimide, 3,3-tetramethylene glutarimide, 1,8-naphthalene dicarboximide or perylene-1,12-dicarboximide, each optionally substituted with one or more halogen atoms, $C_1$–$C_{20}$-alkyl groups, $C_3$–$C_{20}$-alkenyl groups, nitro groups or carboxy groups; or represents a 7-membered cyclic imide which is an adipimide or diphenic imide, each optionally substituted with one or more halogen atoms, $C_1$–$C_{20}$-alkyl groups, $C_3$–$C_{20}$-alkenyl groups, nitro groups or carboxy groups.

2. A composition according to claim 1 wherein MPc is a copper phthalocyanine residue containing no chlorine or bromine.

3. A composition according to claim 1 wherein m is a value within the range of from 0.05 to 0.2.

4. A composition according to claim 1 wherein n is a value within the range of from 1.0 to 3.0.

5. A composition as claimed in claim 1 wherein the thermoplastic resin, component A,) is rubber or an engineering plastics.

6. A composition according to claim 5 wherein the engineering plastics is high density polyethylene, polybutylene terephthalate, a polycarbonate, a polyamide, a polyphenylene oxide, a polyether ether ketone, a polyphenylene sulphide, a polyether sulphone, an acrylonitrile-butadiene-styrene copolymer, polypropylene, polystyrene, a polyacetal or an alloy of these plastics.

7. A composition according to claim 1 wherein the metal phthalocyanine, component (B), is unchlorinated copper phthalocyanine.

8. A composition according to claim 1 wherein the amount of metal phthalocyanine pigment, component (B) present in the composition is 0.001 to 30% by weight, based on the weight of component (A).

9. A composition according to claim 8 wherein the amount of metal phthalocyanine, component (B) is within the range of from 0.001 to 3% by weight, based on the weight of component (A).

10. A composition according to claim 1 wherein, in the compound of formula I, X together with the

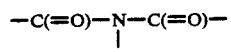

group is a succinimide, maleimide, itaconimide, phthalimide, tetrahydrophthalimide, cis-5-norbornene-endo-2,3-dicarboximide, 3,6-endoxo-1,2,3,6-tetrahydrophthalimide, 1,2- or 2,3-naphthalene dicarboximide or pyridine-2,3-dicarboximide, each optionally substituted with one or more halogen atoms, $C_1$–$C_{20}$ alkyl groups, $C_3$–$C_{20}$ alkenyl groups, nitro groups, or carboxy groups.

11. A composition according to claim 1 wherein X, together with the

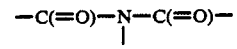

group is a phthalimide group.

12. A method of imparting heat stability to a pigment in a pigmented thermoplastic resin, which comprises incorporating into a resin a metal phthalocyanine pigment, susceptible to degradation by heat, and, as heat stabilizer for said metal phthalocyanine pigment, 0.5 to 30% by weight, based on the weight of said metal phthalocyanine pigment, of a sulphonated imidomethyl phthalocyanine of formula I

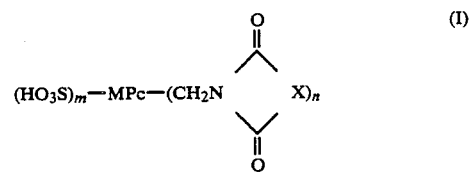

wherein
Pc is a phthalocyanine residue optionally substituted by up to 4 chlorine or bromine atoms;
M is hydrogen or a metal capable of forming a metal phthalocyanine;
m is a value within the range of from 0.05 to 1.0;
n is a value within the range of from 0.1 to 4.0; and
X together with the group

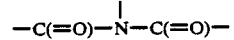

represents a 5-membered cyclic imide which is a succinimide, maleimide, itaconimide, phthalimide, tetrahydrophthalimide, cis-5-norbornene-endo-2,3-dicarboximide, 3,6-endoxo-1,2,3,6-tetrahydrophthalimide, 1,2- or 2,3-naphthalene dicarboximide or pyridine-2,3-dicarboximide, each optionally substituted with one or more halogen atoms, $C_1$–$C_{20}$-alkyl groups, $C_3$–$C_{20}$-alkenyl groups, nitro groups or carboxy groups; or represents a 6-membered cyclic imide which is a glutarimide, 3,3-tetramethylene glutarimide, 1,8-naphthalene dicarboximide or perylene-1,12-dicarboximide, each optionally substituted with one or more halogen atoms, $C_1$–$C_{20}$-alkyl groups, $C_3$–$C_{20}$-alkenyl groups, nitro groups or carboxy groups; or represents a 7-membered cyclic imide which is an adipimide or diphenic imide, each substituted with one or more halogen atoms, $C_1$–$C_{20}$-alkyl groups, $C_3$–$C_{20}$-alkenyl groups, nitro .roups or carboxy groups.

13. A method according to claim 12 wherein the metal phthalocyanine pigment is a crude metal phthalocyanine, and the compound of formula I is incorporated into said crude metal phthalocyanine, during conversion of the latter into pigmentary form, prior to incorporating the mixture of the compound of formula I and the pigmentary metal phthalocyanine into the thermoplastic resin.

* * * * *